US012467166B2

(12) United States Patent
Planckeel et al.

(10) Patent No.: US 12,467,166 B2
(45) Date of Patent: Nov. 11, 2025

(54) METHOD FOR THREE-DIMENSIONAL WEAVING OF A FIBROUS STRUCTURE WITH ORIENTATION OF WEFT COLUMNS IN A DEPLOYMENT PORTION AND RESULTING FIBROUS STRUCTURE

(71) Applicants: SAFRAN CERAMICS, Le Haillan (FR); SAFRAN, Paris (FR)

(72) Inventors: Aline Planckeel, Moissy-Cramayel (FR); Marie Lefebvre, Moissy-Cramayel (FR); Dominique Marie Christian Coupe, Moissy-Cramayel (FR)

(73) Assignees: SAFRAN CERAMICS, Le Haillan (FR); SAFRAN, Paris (FR)

( * ) Notice: Subject to any disclaimer, the term of this patent is extended or adjusted under 35 U.S.C. 154(b) by 0 days.

(21) Appl. No.: 18/877,096

(22) PCT Filed: Jun. 12, 2023

(86) PCT No.: PCT/FR2023/050849
§ 371 (c)(1),
(2) Date: Dec. 19, 2024

(87) PCT Pub. No.: WO2023/247858
PCT Pub. Date: Dec. 28, 2023

(65) Prior Publication Data

US 2025/0171935 A1 May 29, 2025

(30) Foreign Application Priority Data

Jun. 21, 2022 (FR) ........................................ 2206079

(51) Int. Cl.
*D03D 25/00* (2006.01)
*B29B 11/16* (2006.01)
(Continued)

(52) U.S. Cl.
CPC ............ *D03D 25/005* (2013.01); *B29B 11/16* (2013.01); *D03D 1/00* (2013.01); *D03D 13/00* (2013.01);
(Continued)

(58) Field of Classification Search
CPC .................................................... D03D 25/005
See application file for complete search history.

(56) References Cited

U.S. PATENT DOCUMENTS 7,943,535 B2 * 5/2011 Goering .................. B29C 70/24 442/205
10,364,516 B2 7/2019 Marchal et al.
(Continued)

FOREIGN PATENT DOCUMENTS

DE 602 23 222 T2 8/2008

OTHER PUBLICATIONS

International Preliminary Report on Patentability and the Written Opinion of the International Searching Authority as issued in International Patent Application No. PCT/FR2023/050849, dated Dec. 18, 2024.

(Continued)

*Primary Examiner* — Andrew T Piziali
(74) *Attorney, Agent, or Firm* — Pillsbury Winthrop Shaw Pittman LLP

(57) ABSTRACT

In a method for three-dimensional weaving of a fibrous structure between layers of warp yarns and layers of weft yarns, the weft yarns are woven in a plurality of columns spaced apart from one another in a longitudinal direction. The method includes weaving deployment portions in the fibrous structure that is interwoven with an adjacent portion, the weft yarns of the weft yarn columns of the adjacent portion being juxtaposed in a first stacking direction perpendicular to the longitudinal direction. During the process
(Continued)

of weaving the deployment portions, the weft yarns of each weft yarn column are positioned against the fell of the fibrous structure in stacking directions that are different from the first stacking direction.

8 Claims, 6 Drawing Sheets

(51) Int. Cl.

| | |
|---|---|
| ***D03D 1/00*** | (2006.01) |
| ***D03D 13/00*** | (2006.01) |
| ***D03D 49/60*** | (2006.01) |

(52) U.S. Cl.

CPC ......... *D03D 49/60* (2013.01); *D10B 2505/02* (2013.01)

(56) References Cited

U.S. PATENT DOCUMENTS

| | | | |
|---|---|---|---|
| 10,519,576 | B2 | 12/2019 | Marchal et al. |
| 2012/0027572 | A1 | 2/2012 | Denece et al. |
| 2017/0260661 | A1* | 9/2017 | Marchal .................. D03D 1/00 |
| 2020/0108569 | A1 | 4/2020 | Lanfant et al. |

OTHER PUBLICATIONS

International Search Report as issued in International Patent Application No. PCT/FR2023/050849, dated Sep. 25, 2023.

* cited by examiner

[Fig. 1]
PRIOR ART
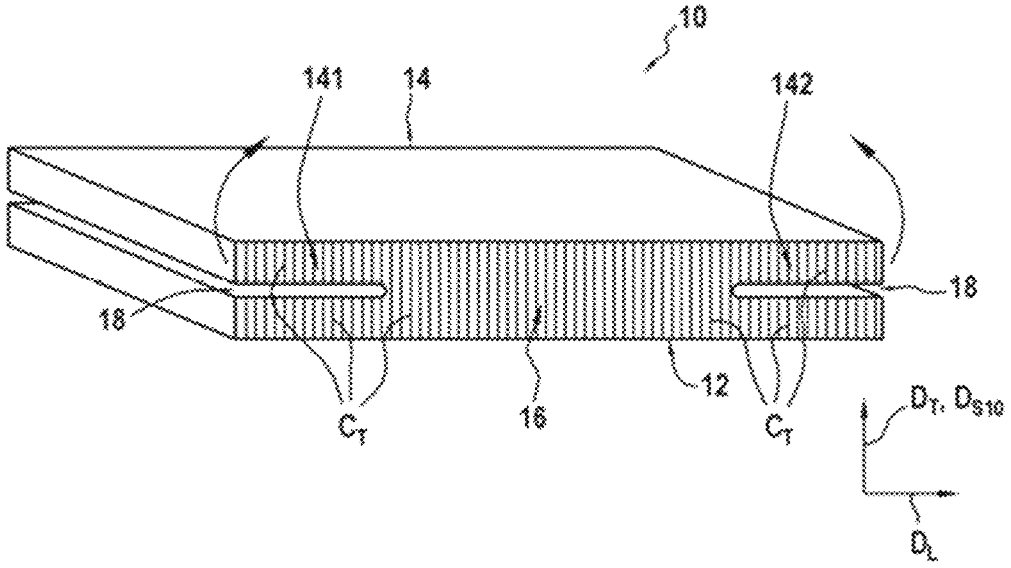
[Fig. 2]
PRIOR ART
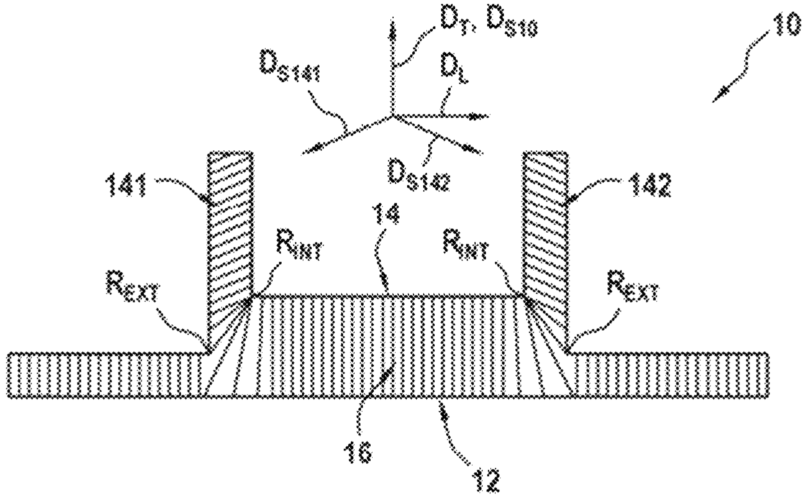

[Fig. 3]
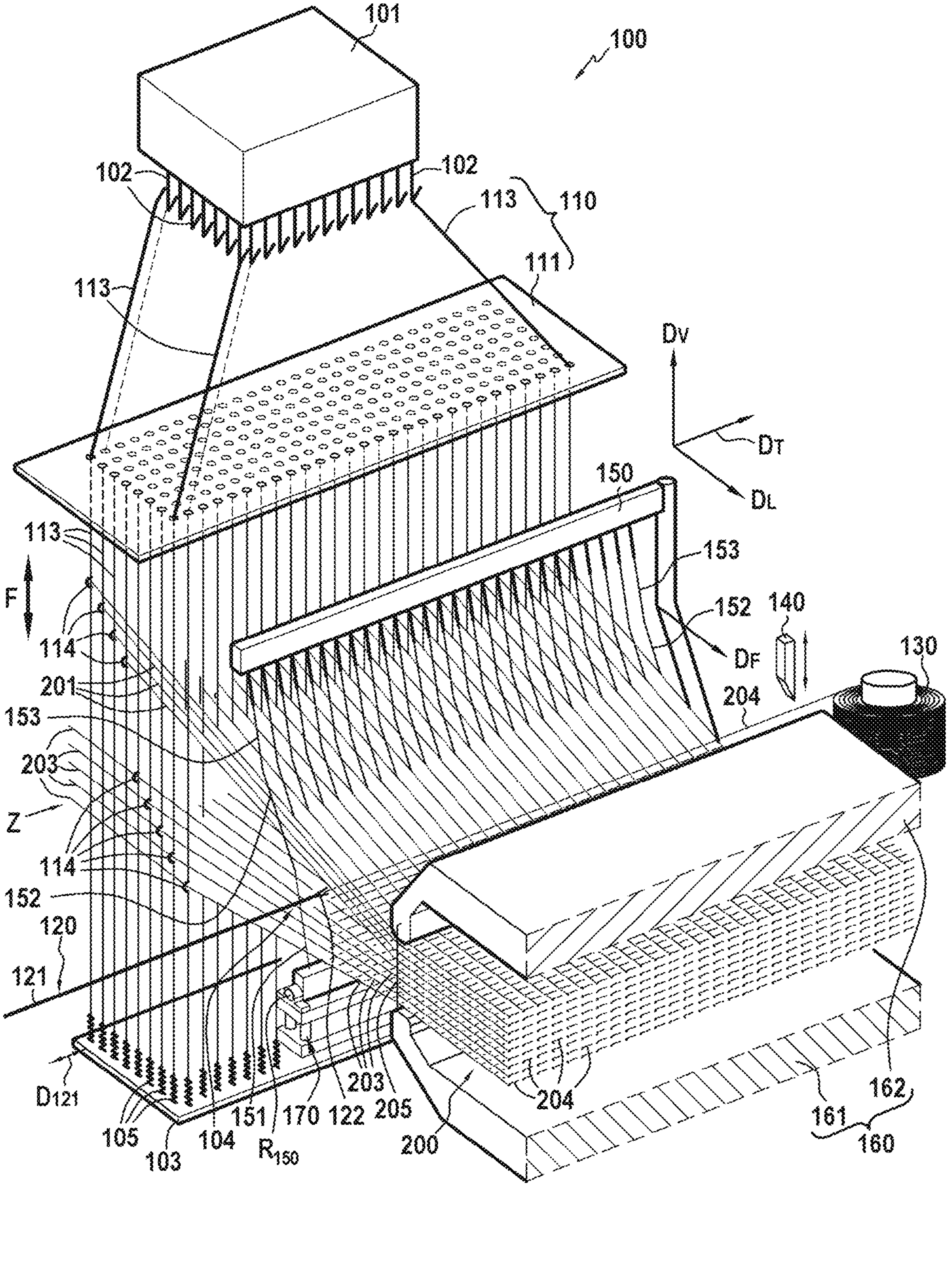

[Fig. 4]
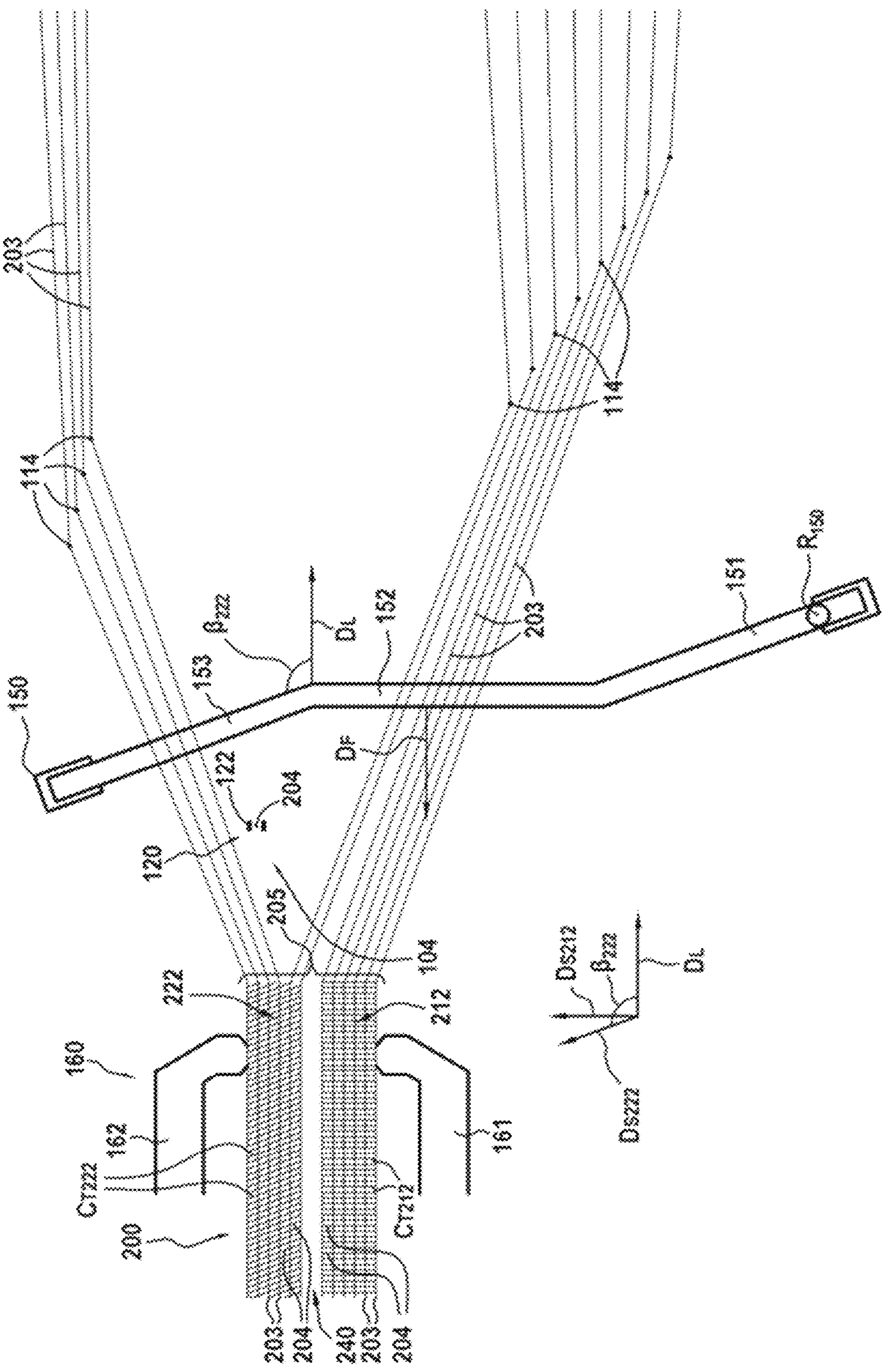

[Fig. 5]
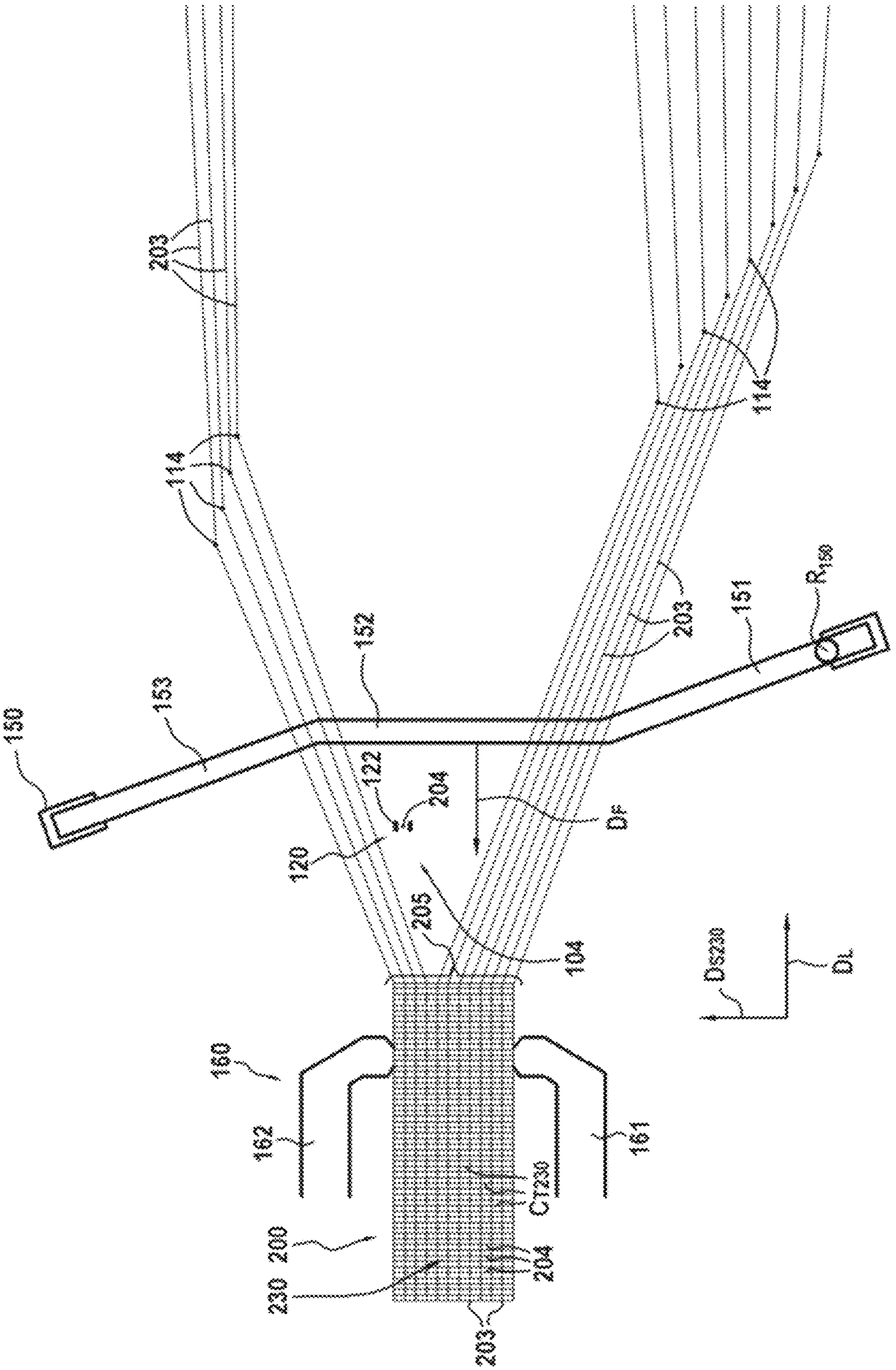

[Fig. 6]
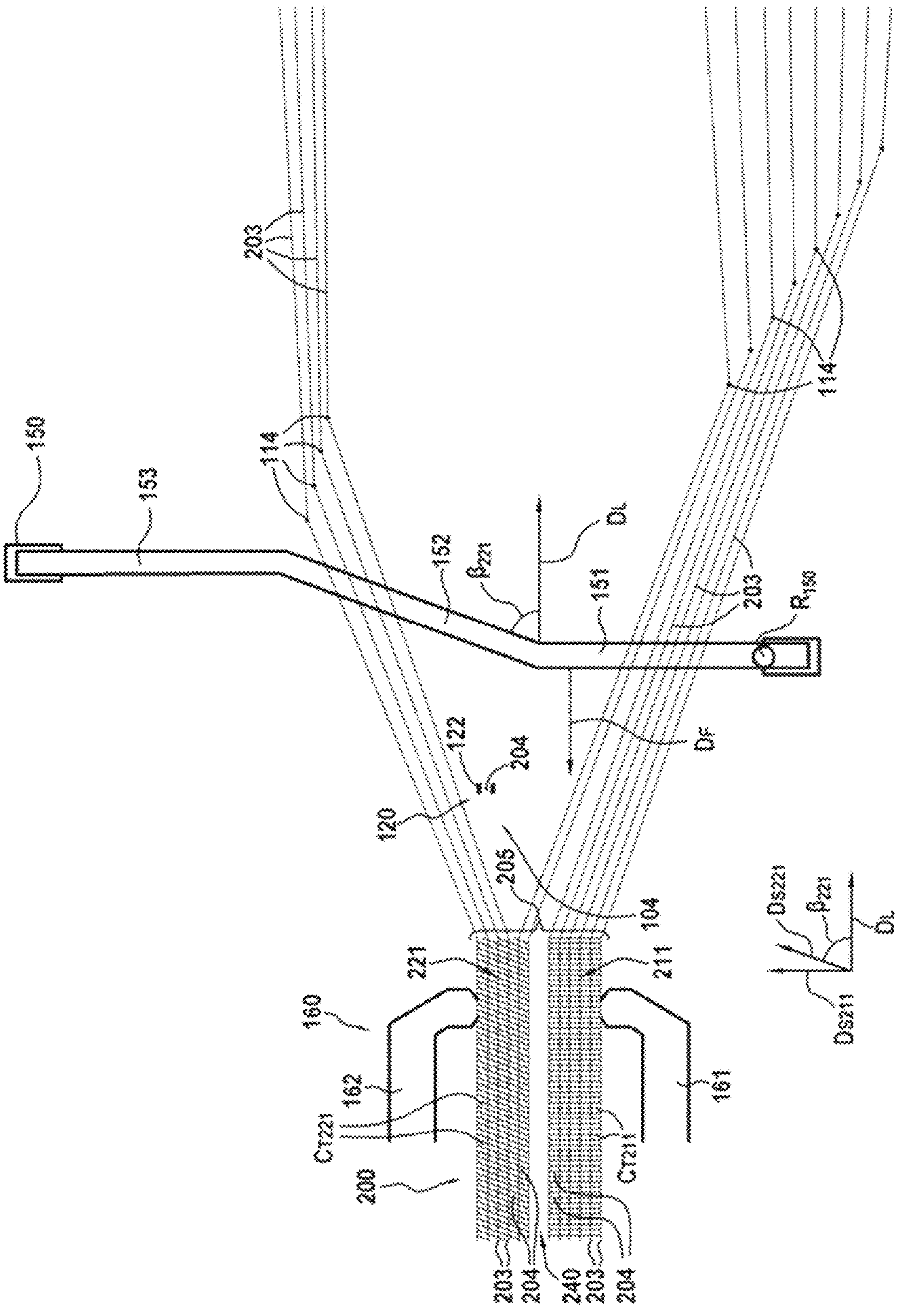

[Fig. 7]
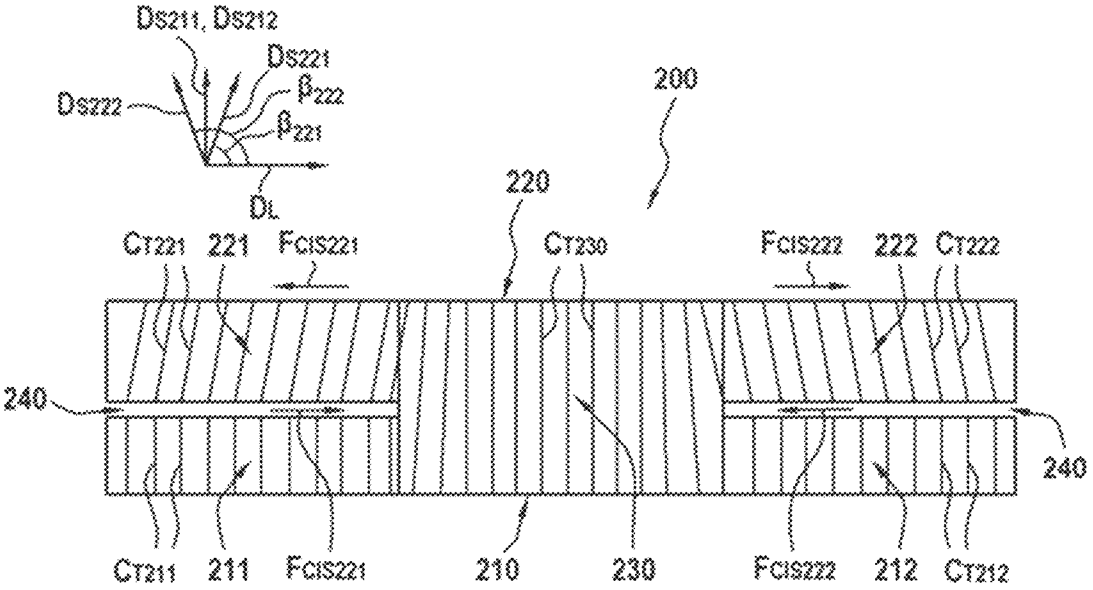
[Fig. 8]
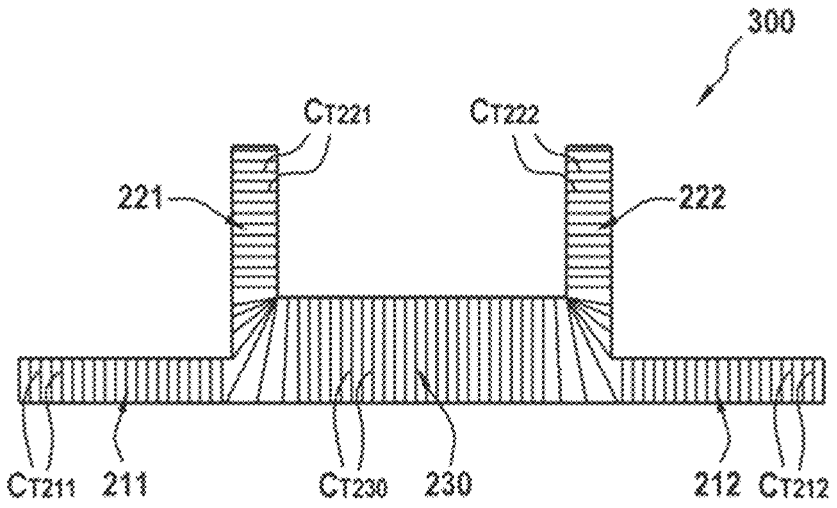

METHOD FOR THREE-DIMENSIONAL WEAVING OF A FIBROUS STRUCTURE WITH ORIENTATION OF WEFT COLUMNS IN A DEPLOYMENT PORTION AND RESULTING FIBROUS STRUCTURE

CROSS-REFERENCE TO RELATED APPLICATIONS

This application is the U.S. National Stage of PCT/FR2023/050849, filed Jun. 12, 2023, which in turn claims priority to French patent application number 2206079 filed Jun. 21, 2022. The content of these applications are incorporated herein by reference in their entireties.

TECHNICAL FIELD

The present invention relates to the production of parts made of composite material and more particularly the production by three-dimensional (3D) weaving of fibrous reinforcement structures for such parts.

PRIOR ART

A field of application of the invention is the production of structural parts made of composite material, that is to say structural parts with fiber reinforcement and densified by a matrix such as organic matrix composite (OMC), carbon matrix (C/C) and ceramic matrix (CMC) material parts. Organic matrix composite (OMC), carbon matrix (C/C) and ceramic matrix (CMC) materials replace metal material parts in certain sections of turbomachines. Their use contributes to optimizing aircraft performance, in particular by improving the efficiency of the turbomachine and reducing the overall mass of the turbomachine, significantly reducing emissions harmful to the environment (CO, $CO_2$, NOx, . . . ).

The invention relates more particularly to the reinforcing fibrous structures obtained by three-dimensional weaving and which comprise one or more deployment portions, that is to say one or more sections intended to be deployed during the shaping of a fibrous structure.

An example of this type of fibrous structure is that used to form the fibrous reinforcement of a turbine ring sector made of composite material as disclosed in particular in document US 2012027572.

FIG. 1 illustrates a fibrous structure 10 intended to form the fibrous reinforcement of a turbine ring sector made of composite material. The structure 10 is obtained by three-dimensional weaving between a plurality of layers of warp yarns and a plurality of layers of weft yarns, the warp yarns extending in a longitudinal direction $D_L$ and the weft yarns extending in a transverse direction $D_T$. The weft yarns are woven in a plurality of columns represented here by lines $C_T$. The weft yarn columns $C_T$ are spaced apart from one another in the longitudinal direction $D_L$, the weft yarns of each weft yarn column being juxtaposed in the thickness of the fibrous structure in a stacking direction $D_{S10}$ perpendicular to the longitudinal direction $D_L$.

The structure 10 comprises a lower section 12 intended to form the base of the ring sector, and an upper section 14 connected to the lower section 12 by a central portion 16. The upper section 14 comprises two deployment portions 141 and 142 present at the opposite lateral ends of the central portion 16 and which are not connected to the lower section 12. In other words, the fibrous structure 10 comprises two non-interlinked areas 18 at two opposite edges in a transverse direction of the structure 10, so as to leave two deployment portions free.

FIG. 2 illustrates the shaping of the fibrous structure 10 by folding the deployment portions 141 and 142 at 90° towards the central portion 16 so as to form, after densification, flanges for the attachment of the ring sector on a ring support structure in a turbine. After folding, the direction of stacking of the weft yarns of the weft columns present in the deployment portions 141 and 142 is modified. More precisely, the directions of stacking $DS_{141}$ and $DS_{142}$ of the weft yarns of the weft columns respectively of the deployment portions 141 and 142 have a significant angular variation relative to their initial stacking direction $DS_{10}$. This angular variation results from the shear forces which are exerted in the deployment portions 141 and 142 during their deployment, the path at the internal radius $R_{INT}$ being shorter than the path of the external radius $R_{EXT}$.

This angular shift in the weft yarn columns causes a detachment in the fiber structure at the internal radius, which is damaging to the finished part because it creates an area devoid of fiber reinforcement. Furthermore, the angular shift causes a misalignment in the concerned portions which can modify the mechanical properties initially defined.

Disclosure of the Invention

It is therefore desirable to have a solution for the production of fibrous structures which do not have the aforementioned disadvantages.

For this purpose, the present invention proposes a method for three-dimensional weaving in one piece of a fibrous structure between a plurality of layers of warp yarns and a plurality of layers of weft yarns, the warp yarns extending in a longitudinal direction corresponding to the direction of travel of said warp yarns, the weft yarns extending in a transverse direction, the weft yarns being woven in a plurality of columns spaced apart from one another in the longitudinal direction, each weft yarn column being positioned against the fell of the fibrous structure, the weft yarns of each weft yarn column being juxtaposed in the thickness of the fibrous structure in a determined stacking direction, the method comprising weaving at least one deployment portion in the fibrous structure, said at least one deployment portion being interwoven with one or more adjacent portions of the fibrous structure, the weft yarns of the weft yarn columns of the adjacent portion(s) being juxtaposed in a first stacking direction perpendicular to the longitudinal direction, characterized in that, during the process of weaving said at least one deployment portion, the weft yarns of each weft yarn column are juxtaposed in a second stacking direction different from the first stacking direction.

A fibrous structure is thus formed comprising one or more deployment portions in which the weft yarns in the weft yarn columns are juxtaposed in a stacking direction forming an angle with the longitudinal direction different from 90° which is capable of compensating for the angular variation imposed during the folding of the deployment portion(s). Thus, after folding of the deployment portion(s), the angular variation resulting from the shear forces exerted therein during their deployment causes the weft yarn columns in these portions to straighten horizontally and prevents detachment in the fibrous structure at the internal radius.

According to a particular characteristic of the method of the invention, the second stacking direction forms an angle with the longitudinal direction comprised between 60° and 80°, more preferably an angle of approximately 70°.

The invention also relates to a method for manufacturing a part made of composite material comprising:

weaving a fibrous structure in accordance with the weaving method according to the invention, shaping the fibrous structure by folding said at least one deployment portion so as to obtain a fibrous preform, densifying the fibrous preform by a matrix.

The method for manufacturing a part made of composite material according to the invention can be used for manufacturing a turbine ring sector, a stiffener or a stationary or moving turbomachine blade.

The invention also relates to a fibrous structure having a three-dimensional weave between a plurality of layers of warp yarns and a plurality of layers of weft yarns, the warp yarns extending in a longitudinal direction, the weft yarns extending in a transverse direction, the structure comprising a plurality of weft yarn columns spaced apart from one another in the longitudinal direction, the weft yarns of each weft yarn column being juxtaposed in the thickness of the fibrous structure in a determined stacking direction, the fibrous structure comprising at least one deployment portion interwoven with one or more adjacent portions of the fibrous structure, the weft yarns of the weft yarn columns of the adjacent portion(s) being juxtaposed in a first stacking direction perpendicular to the longitudinal direction, characterized in that the weft yarns of each weft yarn column in said at least one deployment portion are juxtaposed in a second stacking direction different from the first stacking direction.

According to a particular characteristic of the structure of the invention, the second stacking direction forms an angle with the longitudinal direction comprised between 60° and 80°, more preferably an angle of approximately 70°.

The invention also relates to a part made of composite material comprising a fibrous reinforcement densified by a matrix, characterized in that the fibrous reinforcement comprises a fibrous structure according to the invention.

According to a particular characteristic of the part of the invention, it corresponds to a turbine ring sector, a stiffener or a stationary or moving turbomachine blade.

BRIEF DESCRIPTION OF THE DRAWINGS

FIG. 1 is a schematic perspective view of a fibrous structure according to the prior art, FIG. 2 is a schematic front view showing the structure of FIG. 1 after shaping, FIG. 3 is a schematic perspective view of a Jacquard type loom according to one embodiment of the invention, FIG. 4 is a side view of the loom of FIG. 3 showing the weaving of a first section of the fibrous structure of FIG. 7, FIG. 5 is a side view of the loom of FIG. 3 showing the weaving of a second section of the fibrous structure of FIG. 7, FIG. 6 is a side view of the loom of FIG. 3 showing the weaving of a third section of the fibrous structure of FIG. 7, FIG. 7 is a schematic front view of a fibrous structure in accordance with one embodiment of the invention.

FIG. 8 is a schematic front view of the fibrous structure of FIG. 7 after shaping.

DESCRIPTION OF THE EMBODIMENTS

The invention applies generally to the production of fibrous structures or fabrics by three-dimensional (3D) weaving between layers of warp yarns and layers of weft yarns, the structure comprising at least one portion intended to be deployed during its shaping. "Three-dimensional weaving" or "3D weaving" means here a weaving method by which at least some of the weft yarns bind warp yarns on several layers of warp yarns or vice versa. An example of three-dimensional weaving is the weaving called "interlock" weaving pattern. "Interlock" weave means here a weaving pattern in which each layer of warp yarns binds several layers of weft yarns with all the yarns of the same warp column having the same movement in the plane of the pattern. The yarns used here may in particular be carbon fiber yarns or ceramic fiber yarns such as silicon carbide (SiC) fibers, the invention not being limited to these types of yarns alone.

FIG. 3 illustrates a loom 100 for producing a fibrous structure in accordance with one embodiment of the invention. The loom 100 is equipped with a Jacquard mechanism 101 supported by a superstructure not shown in FIG. 3. The loom 100 also comprises a harness 110 consisting of a weaving board 111 and control yarns or heddles 113, each heddle 113 being connected at one end to a control hook 102 of the Jacquard mechanism 101 and at the other end to one of the return springs 105 fixed to the frame 103 of the loom 100. Each heddle 113 comprises an eyelet 114 traversed by a warp yarn 203. The warp yarns 201 are organized at the harness 110 of the loom into a plurality of layers and columns which are, as explained below, handled by the loom in order to allow the insertion of weft yarns 204 according to the weaving pattern(s) programmed in the weaving loom. The warp yarns 203 extend in a longitudinal direction $D_L$ corresponding to their direction of travel during weaving. The weft yarns 204 are inserted between the warp yarns by column in a transverse direction $D_T$ perpendicular to the longitudinal direction $D_L$. In order to allow the introduction of each weft yarn column during the weaving of the fibrous structure, a warp yarn take-up system (not shown in FIG. 3) is associated with the weaving loom. This system, placed downstream of the weaving loom, has the role of holding all the warp yarns together in a clamping device and of allowing the warp yarns to travel by a determined distance after the insertion of each weft column.

The heddles 113 and their associated eyelet 114 extend in an area Z in which the heddles 113 and the eyelets 114 are animated by a substantially vertical oscillating movement represented by the double arrow F. When creating a shed, as illustrated in FIG. 3, a section of the heddles 113 is subjected to traction forces exerted by the control hooks 102. In this configuration, the heddles 113 allow to lift certain warp yarns 203 and thus create a shed 104 allowing the passage of a lance 120 for the introduction of weft yarns 204.

The lance 120, present downstream of the heddles 113, is composed of a rod 121, a first end of which is connected to an actuation system (not shown in FIG. 3) allowing to move the rod 121 back-and-forth in the double direction $D_{121}$. The other end of the rod 121 is provided with a clamp 122 which, after having traversed the shed 104 during the forward path of the rod 121, picks up a weft yarn 204 stored on a bobbin 130 to unwind it in the shed 104 during the forward path of the rod 121. The weft yarn 204 thus placed inside the shed 104 is cut in the vicinity of the bobbin 130 by a knife 140 and released at its other end by the clamp 122.

A comb 150 present upstream of the lance 120 in its rest position is then folded down in order to pack the weft yarn(s) introduced into the shed 104 against the fell 205 of a fibrous structure 200. The lance 120 is then ready to again pick up a new weft yarn 204 from the bobbin 130 and place it either again in the shed 104 or in a different shed depending on the defined weaving. A fibrous structure 200 having a 3D weave between the warp yarns 203 and the weft yarns 204 is thus gradually formed.

A method for weaving a fibrous structure 200 in accordance with one embodiment is now described. In the example described here, the fibrous structure 200 is intended to form the fibrous reinforcement of a turbine ring sector made of composite material. As illustrated in FIG. 7, the fibrous structure 200 has, once woven, a lower section 210 intended to form the base of the ring sector, and an upper section 220 connected to the lower section 210 by a central portion 230. The upper section 220 comprises two deployment portions 221 and 222 present at the opposite lateral ends of the central portion 230 facing each other respectively with two base portions 211 and 212 of the lower section 210 present at the opposite lateral ends of the central portion 230. The deployment portions 221 and 222 are not connected with the base portions 211 and 212 of the lower section 212, two non-interlinked areas 240 being formed during weaving in the fibrous structure at two opposite edges in a transverse direction of the structure 200, so as to leave two deployment portions free.

FIG. 4 shows the start of weaving of the fibrous structure 200, namely the weaving of the base portion 212 and the deployment portion 222. The portions 222 and 212 are each formed by 3D weaving between a plurality of layers of warp yarns 203 and a plurality of layers of weft yarns 204. The weft yarns are woven in the portions 222 and 212 in a plurality of columns $C_{T222}$ and $C_{T212}$ spaced apart from one another in the longitudinal direction $D_L$. The weft yarns of each weft yarn column $C_{T212}$ of the lower portion 212 are juxtaposed in the thickness of the fibrous structure in a determined stacking direction $D_{S212}$ perpendicular to the longitudinal direction $D_L$. During the process of weaving the portions 212 and 222, the weft yarns present in the deployment portion 222 do not extend into the base portion 212 and vice versa so as to form a non-interlinked area 240 between these two portions.

In accordance with the invention, the weft yarns 204 of each weft yarn column $C_{T222}$ of the deployment portion 222 are positioned against the fell 205 of the fibrous structure 200 in a second stacking direction $D_{S222}$ different from the stacking direction $D_{S212}$. The stacking direction of the weft yarns in each weft column can be adjusted with the comb 150. Indeed, the angle with which the comb strikes the weft yarns against the fell 205 of the fibrous structure 200 determines the stacking direction of the weft yarns in each weft yarn column. In the present invention, an orientable comb is used in order to adjust the striking angle thereof on the fell of the woven fibrous structure according to the stacking direction to be obtained in each weft yarn column. The striking direction of the comb is parallel to the longitudinal direction $D_L$.

In the example described here, the comb 150 comprises first, second and third fixed sections 151, 152 and 153 forming an angle therebetween. The comb 150 is mounted on an axis of rotation $R_{150}$ present here at the lower end of the fixed section 151. The comb 150 is further mounted on a positioning mechanism 170 capable of adjusting the position of the comb in a vertical direction $D_V$ and on a striking mechanism (not shown in FIGS. 3, 4, 5 and 6) allowing to strike the fell 205 of the fibrous structure in a striking direction $D_F$ parallel to the longitudinal direction $D_L$.

During the process of weaving the base portion 212 and the deployment portion 222, the comb 150 is oriented about its axis of rotation $R_{150}$ so that the second fixed section 152 is perpendicular to the longitudinal direction $D_L$ while the third fixed section 153 forms an angle $\beta_{222}$ with the longitudinal direction $D_L$ which is greater than 90°. The comb 150 is positioned in the vertical direction $D_V$ so that the first and second fixed sections 151 and 152 are facing the base portion 212 and the deployment portion 222 respectively. Thus, each time the comb 150 strikes in the striking direction $D_F$, the weft yarns of the base portion 212 are juxtaposed in each weft yarn column in the stacking direction $D_{S212}$ which is perpendicular to the longitudinal direction while the weft yarns of the deployment portion 222 are juxtaposed in each weft yarn column in the stacking direction $D_{S222}$ forming the angle $\beta_{222}$ with the longitudinal direction $D_L$.

The value of the angle $\beta_{222}$ is determined so as to compensate, that is to say cancel, the angular variation imposed on the deployment portion 222 by the shear forces during its shaping by folding.

FIG. 5 the weaving of the central portion 230 of the fibrous structure 200. The central portion 230 is formed by 3D weaving between the plurality of layers of warp yarns 203 and the plurality of layers of weft yarns 204 in the continuity of the base portion 212 and the deployment portion 222. The weft yarns are woven in the portion 230 in a plurality of columns $C_{T230}$ spaced apart from one another in the longitudinal direction $D_L$. The weft yarns of each weft yarn column $C_{T230}$ of the lower portion 212 are juxtaposed in the thickness of the fibrous structure in a determined stacking direction $D_{S230}$ perpendicular to the longitudinal direction $D_L$.

During the process of weaving the central portion 230, the comb 150 is oriented about its axis of rotation $R_{150}$ so that the second fixed section 152 is perpendicular to the longitudinal direction. The comb 150 is positioned in the vertical direction $D_V$ so that the second fixed section 152 is opposite the central portion 230. Thus, each time the comb 150 strikes the fell 205 of the fibrous structure 200 in the striking direction $D_F$, the weft yarns of the central portion 230 are juxtaposed in each weft yarn column in the stacking direction $D_{S230}$ which is perpendicular to the longitudinal direction $D_L$.

FIG. 6 shows the weaving of the base portion 211 and the deployment portion 221. The portions 221 and 211 are each formed by 3D weaving between the plurality of layers of warp yarns 203 and the plurality of layers of weft yarns 204 in the continuity of the central portion 230. The weft yarns are woven in the portions 221 and 211 in a plurality of columns $C_{T221}$ and $C_{T211}$ spaced apart from one another in the longitudinal direction $D_L$. The weft yarns of each weft yarn column $C_{T211}$ of the lower portion 211 are juxtaposed in the thickness of the fibrous structure in a determined stacking direction $D_{S211}$ perpendicular to the longitudinal direction $D_L$. During the process of weaving the portions 211 and 221, the weft yarns present in the deployment portion 221 do not extend into the base portion 211 and vice versa so as to form a non-interlinked area 240 between these two portions.

In accordance with the invention, the weft yarns 204 of each weft yarn column $C_{T221}$ of the deployment portion 221 are positioned against the fell 205 of the fibrous structure 200 in a second stacking direction $D_{S221}$ different from the stacking direction $D_{S211}$.

During the process of weaving the base portion 211 and the deployment portion 221, the comb 150 is oriented about its axis of rotation $R_{150}$ so that the first fixed section 151 is perpendicular to the longitudinal direction while the second fixed section 152 forms an angle $\beta_{221}$ with the longitudinal direction $D_L$ which is less than 90°. The comb 150 is positioned in the vertical direction $D_V$ so that the first and second fixed sections 151 and 152 are facing the base portion 211 and the deployment portion 221 respectively. Thus, each time the comb 150 strikes in the striking direction $D_F$, the weft yarns of the base portion 211 are juxtaposed in each weft yarn column in the stacking direction $D_{S211}$ which is perpendicular to the longitudinal direction while the weft yarns of the deployment portion 221 are juxtaposed in each weft yarn column in the stacking direction $D_{S221}$ forming the angle $\beta_{221}$ with the longitudinal direction $D_L$.

The value of the angle $\beta_{221}$ is determined so as to compensate, that is to say cancel, the angular variation imposed on the deployment portion 221 by the shear forces during its shaping by folding.

At the end of the weaving, the fibrous structure 200 illustrated in FIG. 7 is obtained with deployment portions 221 and 222 in which the weft yarns in the weft yarn columns of weft yarns $C_{T221}$ and $C_{T221}$ are juxtaposed in stacking directions $D_{S221}$ and $D_{S222}$ respectively forming angles $\beta_{221}$ and $\beta_{222}$ with the longitudinal direction which are different from 90° capable of compensating for the angular variation imposed during the folding of the deployment portions 221 and 222. The value of the angles $\beta_{221}$ and $\beta_{222}$ between the stacking directions $D_{S221}$ and $D_{S222}$ and the longitudinal direction $D_L$ is comprised between 60° and 80°, more preferably an angle of approximately 70°.

This compensation is illustrated in FIG. 8 which shows a preform 300 obtained by shaping the fibrous structure 200, that is to say, after folding the deployment portions 221 and 222 at 90° relative to the base portions 211 and 212 and the central portion 230. The angular variation resulting from the shear forces $F_{CIS221}$ and $F_{CIS222}$ which are exerted in the deployment portions 221 and 222 (FIG. 7) during their deployment causes the horizontal straightening of the weft yarn columns in these portions and prevents detachment in the fibrous structure at the internal radius.

The example that has just been described relates to a fibrous structure with several deployment portions woven at the same time as base portions with non-interlinking between the deployment portions and the base portions. The invention of course applies to fibrous structures having different architectures, in particular simpler ones. The weaving method of the invention can be applied to the weaving of a fibrous structure comprising, in a longitudinal direction, a base portion extended by a deployment portion intended to be folded during the shaping of the fibrous structure in order to form an L-shaped preform, for example in the case of the manufacture of a stiffener made of composite material.

In general, the comb may comprise one or more fixed sections while being orientable along an axis of rotation. In the case of a fibrous structure comprising, in a longitudinal direction, a base portion extended by a deployment portion intended to be folded during the shaping of the fibrous structure as described above, the comb may comprise only one fixed section which is oriented differently depending on whether the base portion or the deployment portion is woven. Thus, during the weaving of the deployment portion, the comb is oriented about its axis of rotation so that the fixed section forms with the longitudinal direction of the structure or the direction of travel of the warp yarns an angle other than 90° determined so as to compensate, that is to say cancel, the angular variation imposed on the deployment portion by the shear forces during its shaping by folding. During the process of weaving the base portion, the comb is oriented about its axis of rotation so that the fixed section is perpendicular to the longitudinal direction or the direction of travel of the warp yarns.

According to a particular characteristic of the invention, the relative vertical positioning of the comb with respect to the shape of the fibrous structure can also be achieved in whole or in part by a device for holding the woven fibrous structure 200 present downstream of the heddles 113 and the lance 120. In the example described here, the holding device 160 comprises a lower jaw 161 and an upper jaw 162 each connected to an actuating means (not shown in FIGS. 3 to 6) which is capable of holding the woven structure 200, on the one hand, and of moving the jaws 160 and 161 in the vertical direction $D_V$. The holding device 160 allows to move the fell 205 of the woven structure in the vertical direction $D_V$ upwards or downwards relative to the comb 150. In this case of a loom comprising the holding device, the relative vertical positioning of the comb relative to the fell of the fibrous structure can be achieved by the holding device or by combined movements of the comb and the holding device.

The fibrous preform 300 is then densified in order to form a part made of composite material, in the example described here a gas turbine ring sector. The densification of the fibrous preform intended to form the fibrous reinforcement of the part to be manufactured consists in filling the porosity of the preform, in all or part of the volume thereof, with the material constituting the matrix. This densification can be carried out in a manner known per se according to the liquid method (CVL) or the gas method (CVI), or the ceramic charge injection method (Slurry Cast) or the silicon alloy impregnation method (MI or RMI) or according to a sequence of one or more of these methods.

The liquid method involves impregnating the preform with a liquid composition containing a precursor of the matrix material. The precursor is usually in the form of a polymer, such as a high-performance epoxy resin, optionally diluted in a solvent. The preform is placed in a sealable mold with a housing in the shape of the final molded blade. The mold is then closed and the liquid matrix precursor (for example, a resin) is injected throughout the housing to impregnate the entire fiber section of the preform.

The transformation of the precursor into a matrix, namely its polymerization, is carried out by heat treatment, generally by heating the mold, after elimination of any solvent and crosslinking of the polymer, the preform always being maintained in the mold having a shape corresponding to that of the part to be produced.

In the case of the formation of a carbon or ceramic matrix, the heat treatment consists of pyrolyzing the precursor to transform the matrix into a carbon or ceramic matrix depending on the precursor used and the pyrolysis conditions. For example, liquid ceramic precursors, in particular SiC or SICN, can be resins of the polycarbosilane (PCS) or polytitanocarbosilane (PTCS) or polysilazane (PSZ) type, while liquid carbon precursors can be resins with a relatively high coke content, such as phenolic resins. Several consecutive cycles, from impregnation to heat treatment, can be carried out to achieve the desired degree of densification.

In the case in particular of the formation of an organic matrix, the densification of the fibrous preform can be carried out by the well-known transfer molding method called RTM ("Resin Transfer Molding"). In accordance with the RTM method, the fibrous preform is placed in a mold having the external shape of the part to be produced. A thermosetting resin is injected into the internal space of the mold which comprises the fibrous preform. A pressure gradient is generally established in this internal space between the place where the resin is injected and the evacuation orifices of the latter in order to control and optimize the impregnation of the preform by the resin.

The densification of the preform can also be achieved by polymer impregnation and pyrolysis (PIP), or by impregnation of a slurry cast, containing for example SiC and organic binders, followed by infiltration with liquid silicon ("Melt infiltration").

The densification of the fibrous preform can also be carried out, in a known manner, by gas means by chemical vapor infiltration (CVI) of the matrix. The fibrous preform corresponding to the fibrous reinforcement of the blade to be produced is placed in an oven into which a reaction gas phase is admitted. The pressure and temperature prevailing in the oven and the composition of the gas phase are selected so as to allow the diffusion of the gas phase within the porosity of the preform to form the matrix by depositing, at the core of the material in contact with the fibers, a solid material resulting from a decomposition of a constituent of the gas phase or a reaction between several constituents, unlike the pressure and temperature conditions specific to CVD methods ("Chemical Vapor Deposition") which lead exclusively to a deposit on the surface of the material.

The formation of a SiC matrix can be obtained with methyltrichlorosilane (MTS) giving SiC by decomposition of MTS while a carbon matrix can be obtained with hydrocarbon gases such as methane and/or propane giving carbon by cracking.

A densification combining liquid and gas routes can also be used to facilitate implementation, limit costs and manufacturing cycles while obtaining satisfactory characteristics for the intended use.

The densification methods described above allow to produce, from the fibrous structure of the invention, mainly parts made of organic matrix (OMC), carbon matrix (C/C) and ceramic matrix (CMC) composite material. Organic matrix composite (OMC), carbon matrix composite (C/C) and ceramic matrix composite (CMC) materials replace metal parts in certain sections of turbomachines. Their use contributes to optimizing aircraft performance, in particular by improving the efficiency of the turbomachine and reducing the overall mass of the turbomachine, significantly reducing harmful emissions to the environment (CO, $CO_2$, NOx, etc.).

After densification, a part made of composite material is obtained.

The fibrous structure and the manufacturing method thereof according to the present invention can in particular be used to produce turbine ring sectors, stiffeners, stationary or moving turbomachine blades.

The invention claimed is:

1. A method for three-dimensional weaving in one piece of a fibrous structure between a plurality of layers of warp yarns and a plurality of layers of weft yarns, the warp yarns extending in a longitudinal direction corresponding to a direction of travel of said warp yarns, the weft yarns extending in a transverse direction, the weft yarns being introduced from a creation of a shed, the weft yarns being woven in a plurality of columns spaced apart from one another in the longitudinal direction, each weft yarn column being positioned against a fell of the fibrous structure, the weft yarns of each weft yarn column being juxtaposed in the thickness of the fibrous structure in a stacking direction, the method comprising weaving at least one deployment portion in the fibrous structure, said at least one deployment portion being interwoven with one or more adjacent portions of the fibrous structure, the weft yarns of the weft yarn columns of the one or more adjacent portion(s) being juxtaposed in a first stacking direction perpendicular to the longitudinal direction, wherein, during the weaving of said at least one deployment portion, the weft yarns of each weft yarn column are juxtaposed in a second stacking direction different from the first stacking direction.

2. The method according to claim 1, wherein the second stacking direction forms an angle with the longitudinal direction comprised between 60° and 80°.

3. A method for manufacturing a part made of composite material comprising:

weaving a fibrous structure in accordance with the weaving method according to claim 1, shaping the fibrous structure by folding said at least one deployment portion so as to obtain a fibrous preform, densifying the fibrous preform by a matrix.

4. A process comprising performing the method for manufacturing a part made of composite material according to claim 3 for the manufacture of a turbine ring sector, a stiffener or a stationary or moving turbomachine blade.

5. A fibrous structure having a three-dimensional weave between a plurality of layers of warp yarns and a plurality of layers of weft yarns, the warp yarns extending in a longitudinal direction, the weft yarns extending in a transverse direction, the weft yarns being introduced from a creation of a shed, the structure comprising a plurality of weft yarn columns spaced apart from one another in the longitudinal direction, the weft yarns of each weft yarn column being juxtaposed in the thickness of the fibrous structure in a stacking direction, the fibrous structure comprising at least one deployment portion interwoven with one or more adjacent portions of the fibrous structure, the weft yarns of the weft yarn columns of the one or more adjacent portion being juxtaposed in a first stacking direction perpendicular to the longitudinal direction, wherein the weft yarns of each weft yarn column in said at least one deployment portion are juxtaposed in a second stacking direction different from the first stacking direction.

6. The fibrous structure according to claim 5, wherein the second stacking direction forms an angle with the longitudinal direction comprised between 60° and 80°.

7. A part made of composite material comprising a fibrous reinforcement densified by a matrix characterized in that the fibrous reinforcement comprises a fibrous structure according to claim 5.

8. The part according to claim 7, the part being a turbine ring sector, a stiffener or a stationary or moving turbomachine blade.

* * * * *